INVENTORS:
THOMAS W. G. RICHARDSON, JR.
DEAN P. HEMPHILL
BY: Louis J. Bovasso
THEIR ATTORNEY Sept. 28, 1971   T. W. G. RICHARDSON, JR., ET AL   3,608,321
APPARATUS AND METHOD FOR LAYING PIPELINE UNDERWATER
Filed Nov. 25, 1968                                6 Sheets-Sheet 2

INVENTORS:
THOMAS W. G. RICHARDSON, JR.
DEAN P. HEMPHILL
BY: Louis J. Bovasso
THEIR ATTORNEY

INVENTORS:
THOMAS W. G. RICHARDSON, JR.
DEAN P. HEMPHILL

BY: *Louis J Bovasso*

THEIR ATTORNEY

Sept. 28, 1971   T. W. G. RICHARDSON, JR., ET AL   3,608,321
APPARATUS AND METHOD FOR LAYING PIPELINE UNDERWATER
Filed Nov. 25, 1968                                6 Sheets-Sheet 4

INVENTORS:
THOMAS W. G. RICHARDSON, JR.
DEAN P. HEMPHILL
BY: Louis J. Bovasso

THEIR ATTORNEY

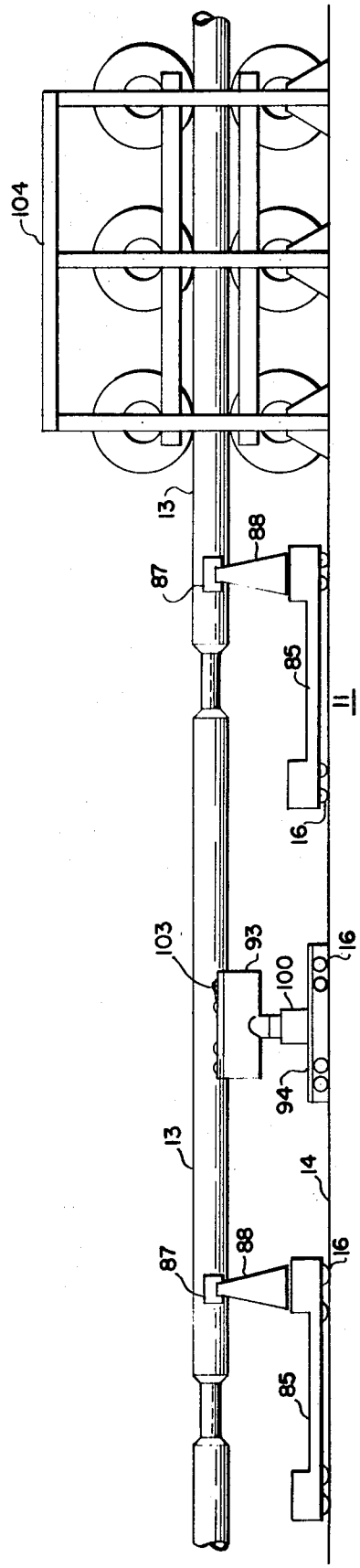
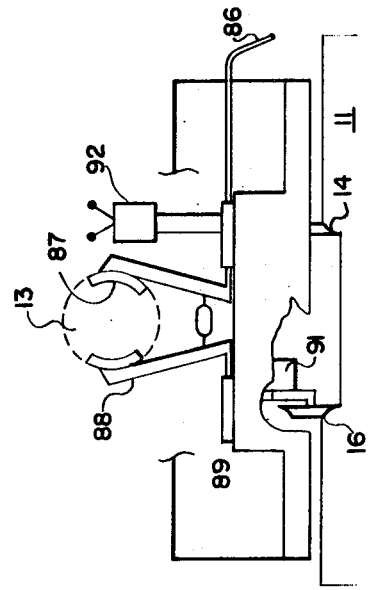
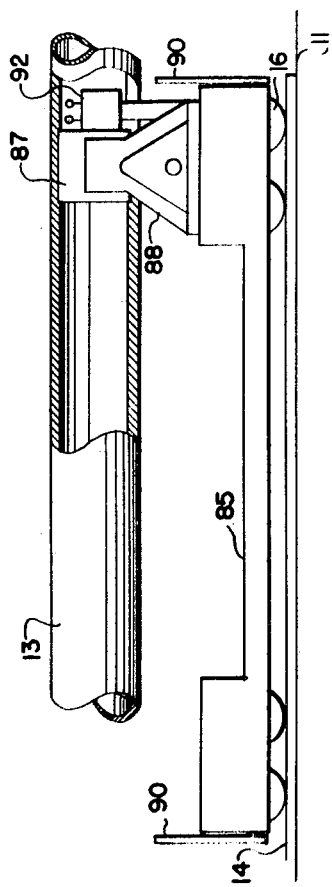
INVENTORS:
THOMAS W. G. RICHARDSON, JR.
DEAN P. HEMPHILL
BY: *Louis J. Bovasso*
THEIR ATTORNEY

United States Patent Office 3,608,321
Patented Sept. 28, 1971

3,608,321
APPARATUS AND METHOD FOR LAYING PIPELINE UNDERWATER
Thomas W. G. Richardson, Jr., and Dean P. Hemphill, Houston, Tex., assignors to Shell Oil Company, New York, N.Y.
Filed Nov. 25, 1968, Ser. No. 779,320
Int. Cl. B63b 35/04
U.S. Cl. 61—72.3     13 Claims

ABSTRACT OF THE DISCLOSURE

Apparatus and method for laying a pipeline underwater from a floatable platform which is adapted to assemble and lay pipeline therefrom. The platform includes at least one trolley mounted for substantially horizontal movement along the platform. The pipeline is selectively held in a steady state relative to the carriage when the floatable platform is standing. A constant restraining force is applied on the trolley to apply a constant tension on the pipeline during vessel surge and to take up relative movement between the trolley and the floatable platform. A constant tension is maintained on the pipeline when the pipeline is released relative to the trolley as the movable platform is moved to effect paying out of the pipeline.

BACKGROUND OF THE INVENTION

Field of the invention

This invention relates to the laying of pipeline and more particularly to an apparatus and method for the laying of pipeline along the floor of a deep body of water from a floating vessel disposed on the surface of the body of water.

Description of the prior art

With the increased development of gas and oil wells offshore, demand for pipeline laying apparatus to connect underwater facilities or to bring products to shore has increased. Frequently, barges are employed to lay underwater pipeline along the floor of a body of water by assembling pipe lengths on the barge and moving the barge as the assembled pipeline is payed out and laid onto the ocean floor. Also, the pipe lengths may be preassembled and wound onto a reel which is then rotatably mounted on the barge. The pipe employed is generally made of steel and capable of withstanding some bending but any bending of the assembled pipeline must stay within predetermined limits to avoid buckling or permanently deforming the pipeline to an extent which would render it ineffective. It will be observed that as pipeline is laid from a barge, the pipeline exits from the barge and follows a somewhat S-shaped configuration from the barge deck to the ocean floor. In relatively shallow waters, the vertical descent of the pipeline, being small, results, in a large radius of curvature of the pipeline as it approaches the ocean floor. However, as the water depth increases, the length of unsupported pipeline increases causing the pipeline to sag under its weight. Thus, the radius of curvature of the pipeline as it approaches the ocean floor becomes smaller and the bending moments imposed on the pipeline may exceed the allowable limits and result in unacceptable permanent deformation or buckling of the pipeline.

Various systems have been devised to facilitate control of the long lengths of pipeline during the laying thereof in deep bodies of water. Typically, these systems employ extensive guide structures at both the lay-barge end of the pipeline and the floor of the body of water, which guide structures function to support the pipeline and control the movement and bending thereof. As additions or alternatives to these guide structures, buoyant elements are also often used in the prior art to support pipeline being laid.

The aforementioned prior art systems have the shortcoming that they gnerally necessitate a start and stop laying operation, since relocation of the supporting guide or buoyant means is often required periodically as the pipeline is laid. Initiating and/or terminating the pipe laying operation is especially difficult in deep water. In the prior art systems, interruptions are also encountered under adverse laying conditions resulting from wind, wave, and/or current action which affect the locating of the extensive guide and buoyancy means. It is noted that the use of extensive guide structures is extremely expensive, since the structures must be fabricated to sustain very high loads. Furthermore, such structures are very susceptible to damage under adverse weather conditions where precise control of the pipeline-laying barge is impossible. Under such conditions intolerable damage may be done to the pipeline being laid.

The foregoing pipeline laying systems also often prove ineffective in controlling the direction in which the pipeline is laid and the stresses occurring in the suspended portion near the point where the pipeline first touches the floor of the body of water. Direction control is difficult due to the susceptibility of the guide or buoyancy means to uncontrolled movement by wind or wave forces. The control of pipeline bending near the point it touches the floor proves difficult in the prior art systems due to irregularities in the floor of the body of water and inadvertent backup of the barge or boat being used to lay the pipeline.

A recently issued patent to Cox et al., U.S. Pat. No. 3,331,212, provides a method for laying pipeline along the floor of a deep body of water while avoiding the shortcomings of prior art systems, such as those discussed above. In this patent, the pipeline is laid from a barge while being held under tension sufficient to maintain the bending and axial stresses applied thereto within a predetermined range. Through continually controlling the tension of the pipeline being laid, excessive bending or kinking of the pipeline is avoided without the necessity of extensive support structures or buoyant support means. At the same time, accurate control of the direction in which the pipeline is being laid is effected. In order to carry out the method disclosed in the Cox et al. patent, it is necessary to provide apparatuses and/or methods which apply tension to a pipeline suspended from a pipeline-laying barge without damaging the pipeline coating which may be a corrosion coating with or without additional weight jacketing material. Further, where an on-deck assembly method is employed, it would be necessary to provide welding stations for joining a plurality of pipe sections together to form a pipeline on a stable-moving platform or platforms which maintain position with respect to the pipeline being laid even though the pipeline laying vessel moves in accordance with the teachings of the Cox et al. patent.

Since any pipeline laying vessel, whatever its hull shape, is subject to motion in a seaway, it is desirable (and for deep water or rough seas necessary) to supply the required pipeline tension in a manner that isolates tension application from vessel motion. Thus, control of the proper pipeline tension would be less affected by sea conditions. Since large diameter pipelines may require weight jacketing for negative buoyancy, the tension needed to prevent overstressing the pipeline during laying becomes very large and requires special equipment.

Two common problems frequently are encountered in laying pipe from a vessel. Initially, as will be discussed hereinbelow in the subject application, relative motion between that portion of the pipeline on the vessel and the vessel itself can seriously hamper the fabrication processes. Certain welding processes used in semi-automatic or automatic welding, for instance, are especially sensitive to these relative motions. These motions are most likely to be objectionable with large diameter pipe in relatively shallow waters.

Secondly, the usual on-board fabrication process, whether completely manual or to some extent automatic, involves an assembly line in which the required work of joining lengths of pipe is divided among two or more working stations for increased speed and efficiency. Experience has shown that the distance between these stations may not be a constant, fixed distance as the fabrication proceeds. Pipe, particularly the seamless line pipe preferred for many submarine pipelines, varies in length from piece to piece. For example, pipe used for one pipeline, although ordered in nominal lengths of 40 feet, actually varied from 32 feet to 45 feet, with approximately 20 percent differing by more than 3 feet from the nominal length. Statistically, it can be shown that such a distribution can result in larger cumulative displacements as the number of pipe lengths (being worked on simultaneously) increases. The result is frequent interference with structures on the vessel or joints being positioned in locations which will not permit work to be carried on, with a resultant loss in fabrication speed. The same situation may arise when longer prefabricated lengths are being used. Two modifications are suggested which, when employed individually or in combination, may alleviate these difficulties to some extent.

SUMMARY OF THE INVENTION

It is an object of this invention to provide a method and apparatus for supplying tension in a pipeline being laid underwater from a pipeline laying vessel in a manner that isolates tension application from vessel motion.

It is a further object of this invention to provide a pipeline laying apparatus and method having a design compatible with the tensioning required to carry out the above object.

It is a still further object of this invention to provide an apparatus and method for introducing tension in a pipeline without damaging the pipeline coating and/or jacketing.

It is an even further object of this invention to provide a method for joining pipe section to pipeline being laid so that both pipe and welding station are so mounted on the barge that there is little or no relative motion between welder (manual or automatic) and pipeline to facilitate joining even though sea conditions may cause barge movement (especially surge longitudinally with respect to the pipeline) that would otherwise cause suspension of pipelaying operations.

It is another object of this invention to provide a method and apparatus for maintaining the tension in such a pipeline reasonably constant in spite of motion of the pipeline laying vessel.

It is still another object of this invention to provide a method and apparatus for carrying out the above objects in a manner that provides capability for adding pipe lengths to the pipeline during continuous pipeline laying so that the work proceeds rapidly enough for economic installation.

These objects are preferably accomplished by providing a floatable platform or pipeline laying vessel which includes at least one trolley mounted for substantially horizontal movement along the platform. The pipeline is assembled on the platform and selectively held in a steady state relative to the trolley when the platform is standing. A constant restraining force is applied on the trolley to apply a constant tension on the pipeline during vessel surge and to take up relative movement between the trolley and the platform. A constant tension is maintained on the pipeline when the pipeline is released relative to the trolley as the movable platform is moved to effect paying out of the pipeline from the pipeline laying vessel.

Welding stations may be provided on the movable platform for joining a plurality of pipe sections together to form the pipeline. These stations are so supported on the platform that they maintain their adjustable relative position with respect to the pipeline even though the pipeline laying vessel moves.

BRIEF DESCRIPTION OF THE DRAWING

FIG. 10 is a vertical, partly sectional view, of a modification of the apparatus of FIG. 1;

FIG. 11 is an end view of the modification of FIG. 10;

FIG. 14 is a vertical view of apparatus incorporating the modifications of FIGS. 10 through 13.

DESCRIPTION OF THE PREFERRED EMBODIMENTS

Figure 1:
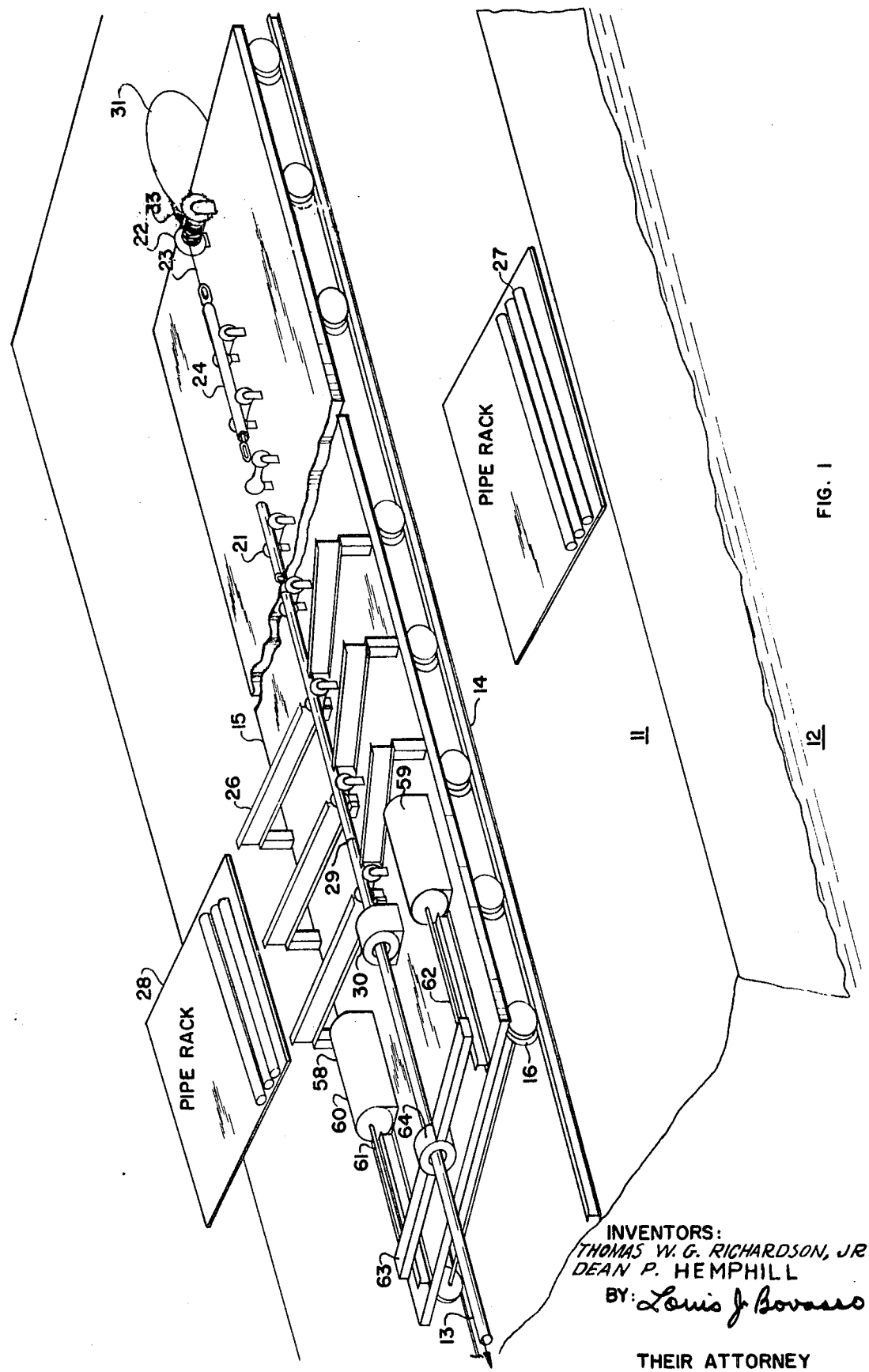
FIG. 1 is a partial isometric view of a pipeline-laying barge incorporating the method and apparatus of the invention.

Referring to the drawing, FIG. 1 shows a pipeline-laying barge 11 in accordance with the teachings of this invention adapted to float on the surface of a body of water 12. The pipeline 13 on barge 11 may be launched from barge 11 in the manner disclosed in the aforementioned patent to Cox et al. A plurality of guide means such as rails 14 are fixedly mounted on the upper surface of barge 11. A movable platform or platforms, such as a trolley 15, is disposed on the upper surface of barge 11. Trolley 15 is provided with a plurality of wheels 16 so that trolley 15 is reciprocable along guide rails 14. Although a single platform is illustrated in FIG. 1 as comprising the trolley 15, obviously trolley 15 may be made up of a plurality of interconnected movable platforms forming a single trolley.

Figure 2:
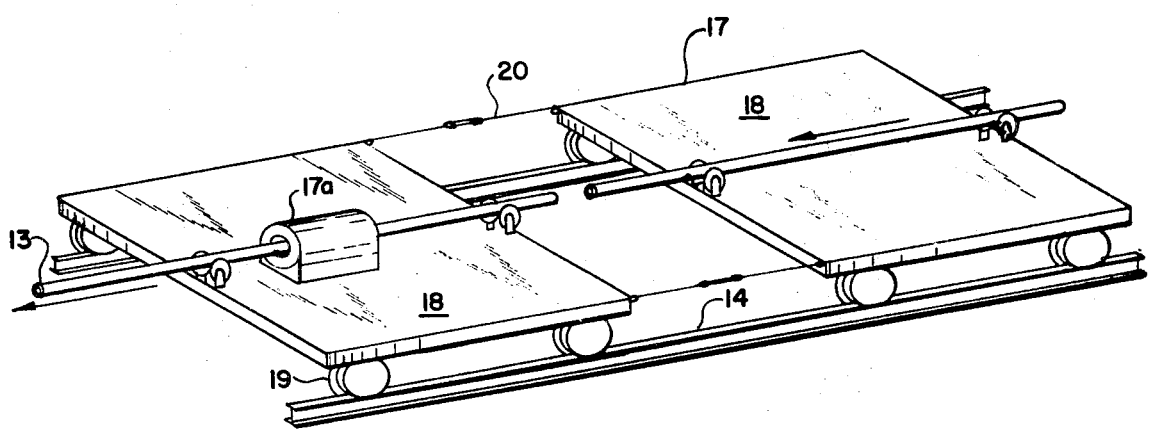
FIGS. 2 and 3 are isometric views of a modification of a portion of the barge of FIG. 1.

Thus, as illustrated in FIG. 2, wherein like numerals refer to like parts of FIG. 1, the trolley 17, similar to trolley 15 of FIG. 1, is comprised of a plurality of interconnected movable platforms 18, each platform 18 having wheels 19 for engaging guide rails 14. Each platform 18 may include the necessary apparatus for joining pipe sections together to form pipeline 13 and for paying pipeline 13 off of barge 11 as will be discussed further hereinbelow. Various means may be used for joining platforms 18 together, such as linkage means 20 fastened or otherwise joined to adjacent platforms 18. Alternately, a means may be provided by which each platform is attached independently to the pipeline. Linkage means 20 may be adjustable if desired, to vary the distance between adjacent platforms 18. As will be explained further hereinbelow, platforms 18 are provided with suitable hold-back devices, such as device 17a, similar to the devices 30 of FIG. 1 as will be explained further hereinbelow.

Referring once again to FIG. 1, a plurality of rollers 21 are disposed on the upper surface of trolley 15. These rollers 21 support therebetween pipeline 13 as shown in FIG. 1. Various types of rollers may be used to support pipeline 13 on trolley 15, as for example, the pipe-line-supporting rollers disclosed in a copending application to Broussard et al., Ser. No. 600,196, filed Dec. 8, 1966.

A conventional heavy-duty winch 22 (with controlled constant tensioning device) is preferably disposed at the forward (leading) end of barge 11 on trolley 15. Winch 22 carries a cable 23 which is coupled to one end of a conventional running hold-back tool 24 supported on rollers 21. The free end of tool 24 is adapted to be joined selectively to the free end of pipeline 13 as is well known in the pipeline laying art for reasons to be discussed further hereinbelow; alternatively, winch 22 may be mounted directly on the barge 11 itself, if desired.

Figure 3:
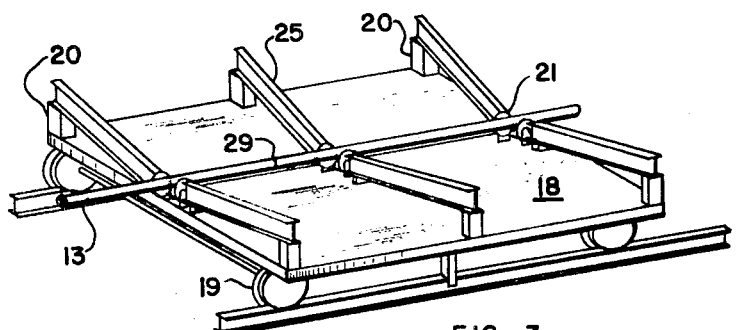

Various "stations" for joining a plurality of pipe sections together to form pipeline 13 may be disposed along trolley 15. For example, a welding station may be disposed on trolley 15 for joining a pair of pipe sections together. The trolley 17, comprising the movable platforms 18, may include a plurality of conventional make-up and welding stations at each platform. Thus, a plurality of guide rails 25 are disposed on the upper surface of platform 18 (FIG. 3) for guiding pipe sections into place on rollers 21 for subsequent welding. Similar stations may be disposed along trolley 15 of FIG. 1. Thus, one such station may include guide rails 26 similar to guide rails 25 of FIG. 3 on trolley 15 cooperating with rollers 21 for guiding a plurality of pipe sections 27 from pipe rack 28 on barge 11 and into alignment with pipeline 13. The pipe sections 27 are then welded at 29 as is well known in the art. It is to be understood that a similar pipe rack (not shown) cooperates with guide rails 25 of FIG. 3 for forming pipeline 13 using a trolley comprising a plurality of movable stations such as illustrated in FIGS. 2 and 3.

A gripping device, such as a standing hold-back device 30, is disposed on the upper surface of trolley 15 for holding pipeline 13 stationary with respect to the movable trolley 15. Hold-back device 30 may be any conventional device capable of holding pipeline 13 stationary such as conventional pipe casing slips.

Figure 4:
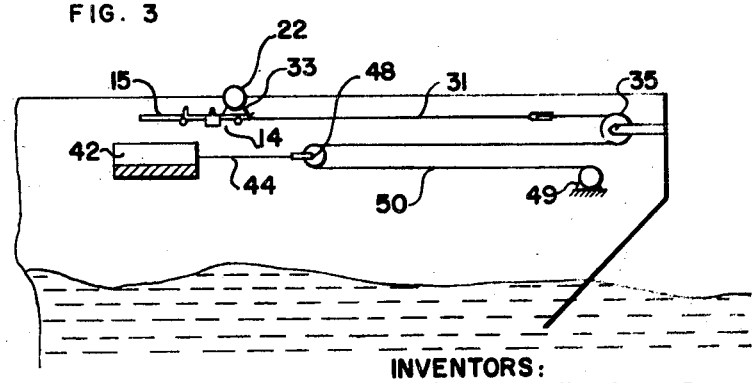
FIG. 4 is a vertical sectional view of a portion of the barge of FIG. 1.
Figure 5:
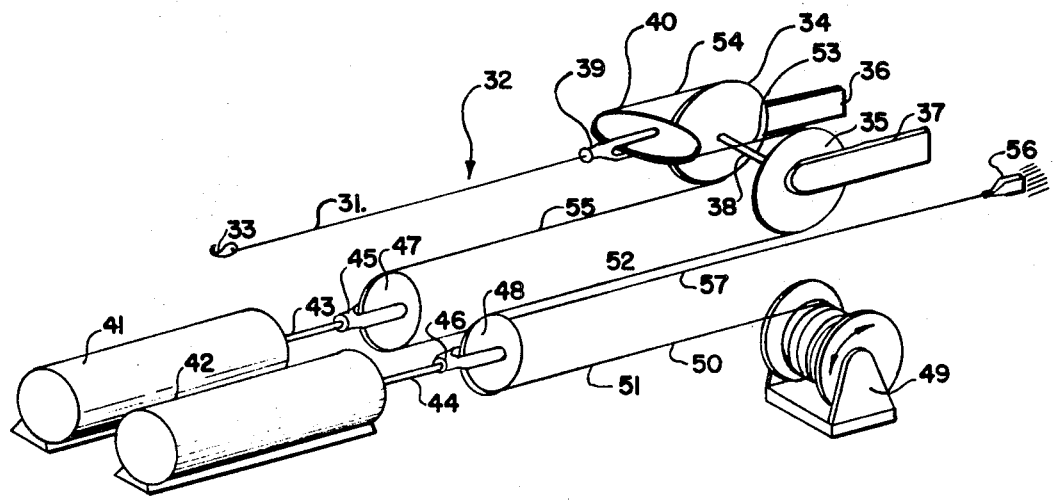
FIG. 5 is an isometric view of a portion of FIG. 4.

A constant tension device, such as a piston-cylinder and wire rope arrangement, is preferably operatively attached to the trolley 15 (or trolley 17). For example, a wire rope 31 attached to the forward end of trolley 15 leads to a system 32 as shown in FIG. 4. The system 32 includes a hook 33 for fastening to trolley 15 attached to the wire rope or line 31 as best seen in FIG. 5.

System 32 (FIG. 5) includes a pair of parallel pulleys 34 and 35 fastened to barge 11 through a pair of support bars 36 and 37, respectively. Pulleys 34 and 35 are fastened to each other in spool-fashion by means of rod 38. Line 31 is fastened at its free end to the handle portion 39 of a pulley 40. The plane of pulley 40 is normal to and tangential to the planes of pulleys 34 and 35. The overall length of line 31 between hook 33 and handle portion 39 is preferably substantially equal to the length of the welding station on barge 11 (FIG. 1) so that sufficient space is provided for the welding station and constant tension of system 32 maintains the relative position of trolley 15 with the pipeline 13 when barge 11 is moved.

Power for system 32 is preferably provided by a pair of hydraulic cylinders 41 and 42 disposed below hook 33. The piston rods 43 and 44 of cylinders 41 and 42, respectively, are fixed to the handle portions 45 and 46, respectively, of a pair of pulleys 47 and 48. Pulleys 47 and 48 are also disposed below hook 33. Pulleys 47 and 48 are parallel to each other and their planes lie in the planes of pulleys 34 and 35, respectively. A winch 49 is preferably deposed vertically below pulleys 34 and 35. A wire line 50 is payed out from winch 49 such that line 50 extends from winch 49 to pulley 48 about the sheave thereof and back to pulley 35. Thus, the first portion 51 of line 50 is parallel to the second portion 52 of line 50, both portions lying in the same plane. Line 50 passes around the sheave of pulley 35, then around the sheave of pulley 40 such that the third portion 53 of line 50 is parallel to the fourth portion 54 of line 50. Both the third and fourth portions 53 and 54 lie in the same plane normal to the plane of portions 51 and 52. Line 50 passes about the sheave of pulley 34 so that a fifth portion 55 of line 50 is parallel to line 31 and in the same plane thereof, then about the sheave of pulley 47 and back to a fixture 56 fixed to barge 11 such that the sixth portions 57 of line 50 is parallel to the fifth portion 55 and lying in the same plane thereof. In this manner, a constant tension may be provided on trolley 15 controlled by cylinders 41 and 42. The piston rods 43 and 44 preferably have a stroke at least one-half that of the length of line 31 and pulleys 47 and 48 are one-half the diameter of pulleys 34 and 35 so that, for each stroke of rods 43 and 44, line 31 (and thus trolley 15) moves twice the distance thereof. Obviously, a similar arrangement may be provided for the trolley 17 of FIG. 2. Also, various types of constant tensioning devices and/or arrangements may occur to one skilled in the art. The system 32 may also be adjusted to provide any desired degree of tension, such as by means of fluid motors, etc.

Referring now to FIG. 1, piston rods 61 and 62 of hydraulic cylinders 58 and 59, respectively, are fastened to a cross-bar 63. Cross-bar 63 includes a pipe gripping portion 64 for gripping pipeline 13 as is well known in the art.

In operation, proper tension may be supplied to the suspended pipeline 13 by the slips of "standing" hold-back device 30 and the actuation of cylinders 58 and 59 to provide a "running" hold-back through gripping portion 64. Alternatively, winch 22 and tool 24 may be coupled to the rear end of pipeline 13 to provide an additional or substitute "running" hold-back tension.

Constant tension is supplied by means of the winch and cylinders system 32. As discussed hereinabove, the constant tension support for the trolley 15 is correlated to the length of a welding station on trolley 15 so that no relative movement exists with respect to pipeline 13. Thus, the pipeline 13 is selectively held in a steady state relative to trolley 15 by means of standing hold-back device 30 when barge 11 is "standing" in the body of water 12. A constant restraining force is applied to trolley 15 by means of system 32 thereby applying a constant tension on pipeline 13 during surge of barge 11 and taking up relative movement between the trolley 15 and barge 11. A constant tension is maintained on pipeline 13 by means of winch 22 and/or cylinders 59 and 60 acting on gripping portion 64 when pipeline 13 is released relative to the trolley 15 as barge 11 is moved to effect paying out of pipeline 13.

As illustrated in FIGS. 2 and 3, pipeline 13 from barge 11 may be supported on a plurality of rail truck-mounted, constant tension-held, stable-moving welding station platforms 18. Constant tension may be supplied to a train of such platforms 18 (or to the one elongated rail-mounted trolley 15 of FIG. 1) by the system 32 (FIG. 5).

Since the pipeline 13 being laid from barge 11 may have a corrosion protection coating or weight jacketing, it is necessary that tension be introduced to the pipeline 13 in a way that does not damage these pipe coverings. The tension load must be distributed over a large section of the coated pipe to avoid coating damage and provide some assurance that the bonding strength of the coating to the pipe is sufficient for transferring tension into pipeline 13.

Figure 6:
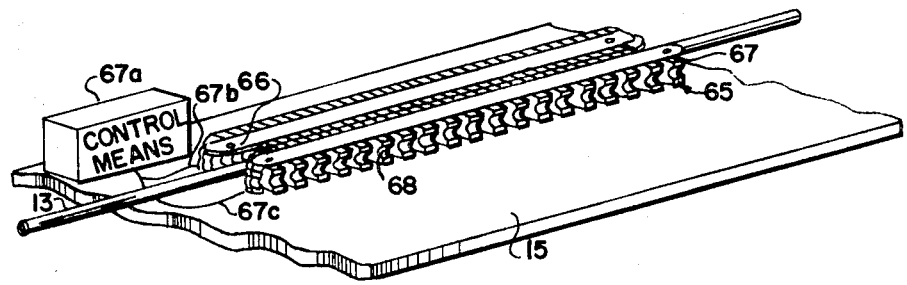
FIGS. 6 through 8 are isometric views of modifications of a portion of the barge of FIG. 1.
Figure 7:
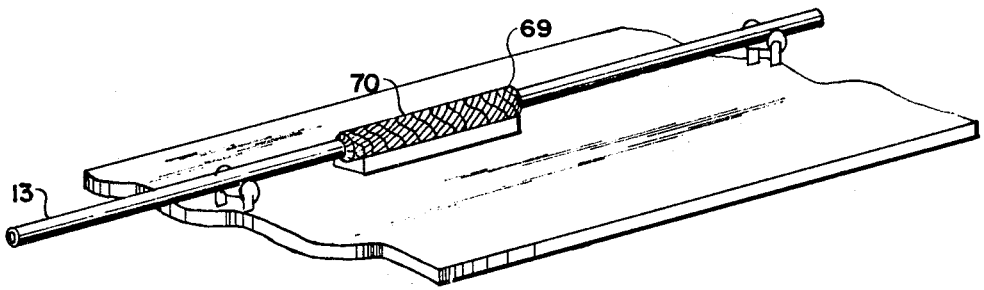
Figure 8:
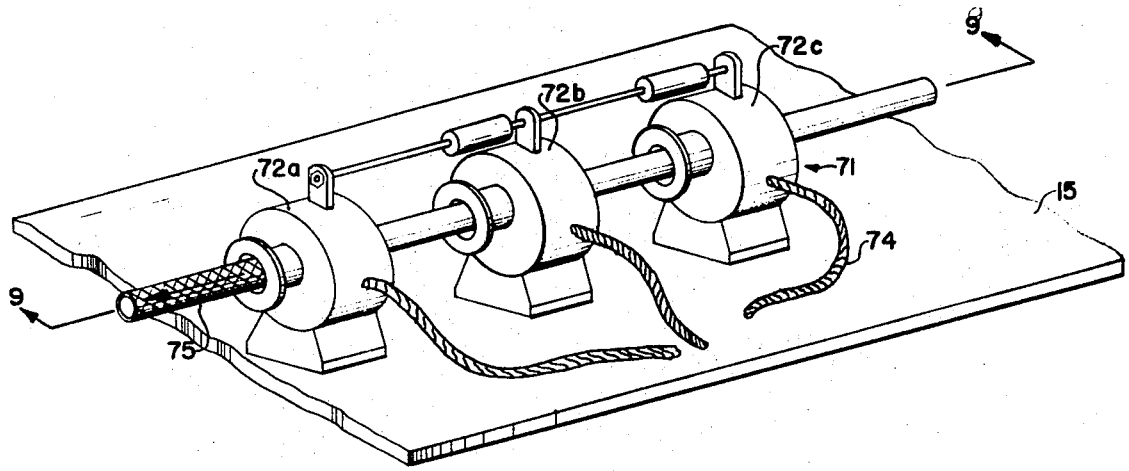

Thus, alternatively to device 30, standing hold-back tension may be provided to pipeline 13 by any of the devices of FIGS. 6 through 8. Referring now to the device 65 of FIG. 6, a pair of endless belt tracks 66 and 67 are disposed on each side of pipeline 13 adapted to be actuated by conventional control means 67a coupled through lines 67b and 67c to tracks 66 and 67, respectively. Tracks 66 and 67 are provided with hydraulic or pneumatic pistons (not shown) co-acting with rollers 68 to apply equal pressure at every point of contact with pipeline 13 to force tracks 66 and 67 against the pipeline 13. Thus, standing hold-back device 65 of FIG. 6 provides distributed hold-back tension without concentrating excessive loads on the pipe, pipe coating, or the device itself.

FIG. 7 shows a standing hold-back device 69 comprising a soft-lined basketweave wire sleeve gripper 70, similar to a "Chinese finger-gripper puzzle," which may be used to distribute tensile load. This type of grip is such that more back pull results in increased holding pressure.

It is a most important feature of this invention that a method be provided for pipe joining on a moving pipelaying vessel by eliminating relative longitudinal motion (resulting from vessel surge motion due to sea condition) of pipeline and welding station (whether manual or automatic). In the present state of the art, small amplitude surge motion of the barge (i.e. forward and backward motion parallel with pipeline assembly and laying direction), forces suspension of pipe joining operations because joint alignment and contact cannot be maintained even with "line-up clamps" nor can line-up clamps be secured to the pipe. Thus, this invention provides for supporting pipeline 13 (which is longitudinally fixed by contact with the sea floor) and the welder on a moving platform which is isolated from vessel surge motion.

Figure 9:
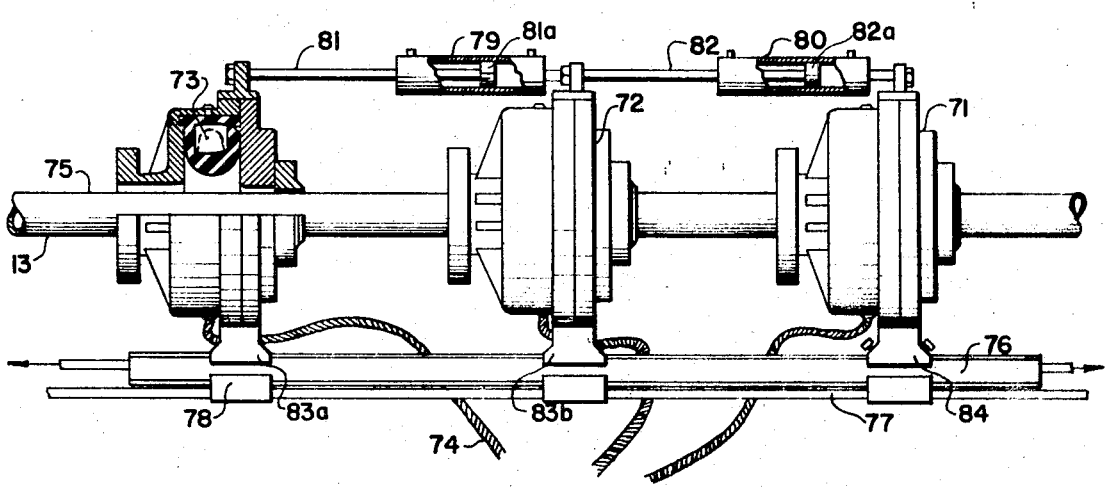
FIG. 9 is a cross-sectional view taken along lines IX—IX of FIG. 8.

There are a number of alternative methods for arranging incremental tension sequential operation of the standing and running holdbacks as outlined in this patent application. A further alternative standing hold-back device 71 is illustrated in FIG. 8. Device 71 includes a plurality or series of bag closing pipeline grippers 72 such as bag devices 72a, b and c. As illustrated in FIG. 9, soft bags 73 inside of grippers 72, such as bags 73a, b and c inside of bag devices 72a, b and c, respectively, using air or hydraulic pressure from hoses 74 which lead to an external pressurized fluid supply (not shown), transfer tension into the coated pipeline 13 without crushing the pipe coating 75 thereon. Bags 73 are pneumatic or hydraulic inflatable and may be constructed of reinforced Hycar rubber or similar materials used in oil field drilling rig "bag closing" blowout preventers. Individual grippers 72 are mounted on a first skid rail 76 for independent movement of pipeline grippers 72 for sequential operation of grippers 72 so that no single gripper carries more than maximum allowable tension hold-back. The device 71 is mounted on a second skid rail 77 by means of sliding clamps 78 for movement of the entire device 71 under constant tension. One or more pressure cylinders 79 and 80 are coupled to grippers 72 to provide sequential operation of grippers 72. The piston rods 81 and 82, having pistons 81a and 82a, respectively disposed within cylinders 79 and 80, respectively, are connected to each gripper 72 for sliding movement of grippers 72 along pipeline 13. Cylinders 79, 80 or more, are activated by pneumatic or hydraulic pressure, individually or collectively, with controlled force to provide proper tension in rods 81 and 82 (or more) so that each successive bag closing gripper 72 automatically introduces say 30,000 pounds, incremental tension into the pipeline 13. This controlled force is predetermined by cylinder pressure and piston area. Thus, grippers 72 mounted on skid rail 76 may slide thereupon as barge 11 surges back and forth. Constant tension may be supplied to skid rail 76 by a device comprised of hydraulic pistons and wire ropes with sheaves as illustrated in FIGS. 4 and 5 to provide constant tension to rail 76, as indicated by the arrows in FIG. 9, independent of the surge motion of barge 11. By connecting the independently sliding bag closing pipe grippers 72 in a train by means of hydraulic or pneumatic cylinders 79 and 80, the individual pipe grippers may be arranged to provide increments of tension in sequenced operation. For example, the gripper 72 nearest the stern of the barge 11 (i.e., the point on the barge 11 nearest where pipeline 13 enters the water 12) is engaged first and supplied up to some predetermined amount of tension, such as 30,000 pounds. Then, if more tension is required, a second gripper 72 may be engaged and so on until sufficient tension has been applied. The sequence may be arranged to work from the other end of trolley 15, if desired. The pressure on cylinders 79 and 80 and pistons 81 and 82 connecting the grippers 72 in series may be pre-set for the increment of tension desired. Activation of successive bag closing grippers 72 is automatic when each piston 81 and 82 is fully extended (or, in reverse, fully retracted). As illustrated in FIG. 9, device 71 also includes a top skid rail clamp 84 fixed to the rail 76; other clamps 83a and b (or more) are free to slide on rail 76, and rail 76 (constant tension restrained) is free to slide in clamps 78, which may be secured to the barge deck or to the "stable-moving" rail truck platforms 18.

"Constant tension" is supplied to the pipeline 13 being laid via skid rail 76 and clamp 84 to device 71 and, thence, via rods 81, 82, etc., through sequentially operated grippers 73 to pipeline coating 75 and pipeline 13. Also, pipe rollers (such as 21) may be required to provide "stand-off guiding" for grippers 73 when released so the assembled pipeline add-on length pipe sections 27 may be launched off the stern end of the pipelaying barge without dragging on or damaging the gripper bags 73. Further note that all pipe rollers 21 could be hydraulically operated (raising, lowering, etc.) to facilitate pipe line-up at welding stations where pipe sections are joined.

The arrangement outlined hereinabove allows the pipeline 13 to proceed continuously through all bag closing grippers 72 of the "standing holdback" (at the after end of the barge) to a series of welding stations so that, when the added length sections of pipe have been joined to the pipeline, the "load" (controlled constant tension on the pipeline) may be transferred to the "running holdback" (say, like constant tension winch 22) on the pipeline end at the forward or leading end of the pipelaying barge 11, and the "standing holdback" may be released for "running" (i.e., lowering) the added length of the assembled pipeline 13 through the bag closing grippers until sufficient pipeline length has been launched and the grippers of the "standing holdback" are again sequentially re-energized to secure the pipeline 13 with proper tension so that the entire process may be repeated for additional added lengths of pipe.

Sequential operation of the automatic bag closing, proper constant incremental tension, hold-back assembly is as follows: (1) "bag" device 72a is energized by manually opening a switch or valve (not shown) to a pneumatic or hydraulic pressure supply (also not shown); (2) this applies pressure inside bag 73a (inside 72a device), thus causing it to close on the pipe with distributed gripping load applied circumferentially along a length of the pipe and coating; (3) thus, an increment of tension is introduced into both the pipeline 13 equal to the tension in piston rod 81, which is controlled by pressure, and the area of the piston 81a in cylinder 79, which is connected to bag device 72b; (4) bag device 72b is connected to bag device 72c via rod 82 and cylinder 80 (perhaps as yet unenergized) (and so on until a bag device such as 72c is reached); (5) and bag device 72c is secured to constant tension held skid rail 76 by clamp 84 (whereas clamps 83a and 83b are "guide clamps" which allow grippers 72 and bags 73 to slide along the movable skid rail 76). Pressure on cylinder 79 is such that only up to, say, 30,000 pounds tension is allowed in rod 81, and only this much tension can be introduced into the pipeline 13 by bag gripper device 72a. If more than 30,000 pounds pipeline tension is required (total amount of pipeline tension required is predetermined and set on the constant tension device connected to skid rail 76), a limit switch (or other device) on rod 81 energizes device 72b's bag gripper 73b and cylinder (pressure) 80 so that additional tension can be supplied to the pipeline via rod 82 and bag 73b. When, for example, 60,000 pounds pipeline tension is required, bag 72c (and so on) is activated.

Work stations which are on movable platforms, as described hereinabove in the subject application, will eliminate the problem of pipe motion relative to the worker. Additionally, if these stations are separate and have the ability to position themselves so as to compensate for the variation in pipe lengths before being engaged to move with the pipe, efficiency will be increased.

One particular embodiment would apply controlled tension directly from the vessel deck to the pipe by means of a constant tension device which could be in the form of a standing hold back mounted on a constant tension-positioned trolley, or by a deck mounted device similar to the roller track of FIG. 6, or by one of the rubber-tired constant tension machines such as that produced by Rasco Hydraulics, Inc., of Dallas, Tex., and described in their sales bulletin No. S–100 (1968). The individual work stations may then be positioned and secured relative to each other by direct mechanical or other connection, or more simply by individual attachment to the pipe. It is obvious that such work stations may simply provide working surface for manual fabrication operations such as welding, radiographic inspection, application of coatings, etc.; or they may serve as the carrier for semiautomatic or fully automatic devices for welding, etc.

As is suggested in FIGS. 10 and 11, wherein like numerals refer to like parts of FIGS. 1 through 9, platforms 85 may incorporate power application units for moving into position (or this power may be from an external source (not shown) such as a cable 86 leading to a winch, air tugger, etc.), clamping means such as clamps 87 fixed to clamping arms 88 and actuated by clamp actuator 89 for gripping the pipeline 13 and a conventional quick release device 90 to disengage the grip from the pipeline 13 in the event of contact with other equipment.

In the event that the work stations should carry heavy equipment such as automatic welding machines, it may be desirable to reduce inertial loads by including an automatic, powered positioning system, such as system 91, holding each work station in position relative to the pipeline 13 in response to sensors (not shown) mounted on the grip. The platforms 85 may each include necessary controls 92 for actuating the system 91, actuator 89 and the external power source.

It is necessary to support the pipe above the surface of the vessel to provide access for fabrication operations and also to position the pipe in the vertical curve of the transition between the more or less horizontal deck and the launching device. The location of these supports may be determined by the desired curvature in the pipe, by the bending characteristics of the pipe or by the location of other structures or work operations.

Figure 12:
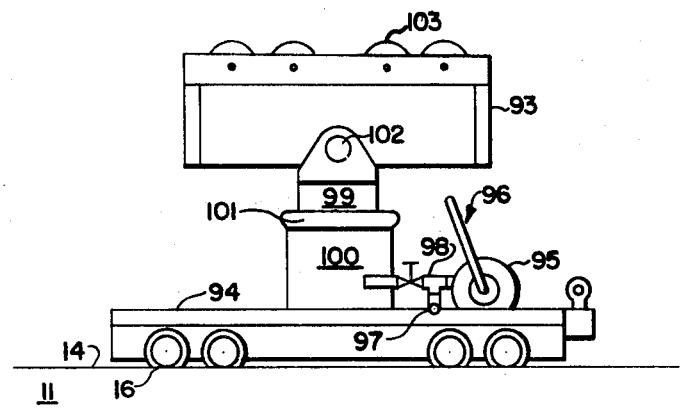
FIG. 12 is a vertical view of a further modification of the apparatus of FIG. 1.
Figure 13:
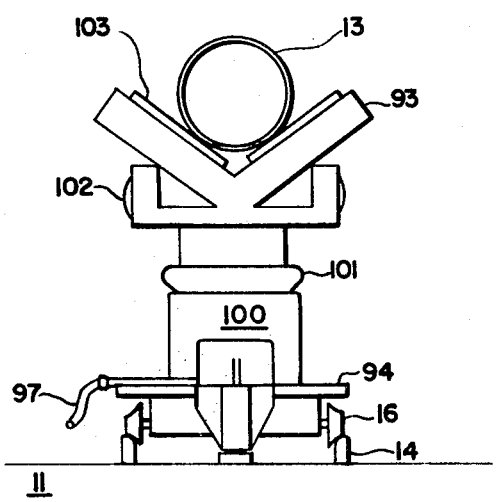
FIG. 13 is an end view of the modification of FIG. 12.

For the reasons mentioned earlier, these supports at times may interfere with fabrication. The pipe supports may, however, be mounted on movable trolleys to permit limited relocation on those occasions when interference is present. The range of movement may be quite limited (that is, not more than the length of the support portion contacting the pipe). Thus, as illustrated in FIGS. 12 and 13, wherein like numerals refer to like parts of FIGS. 1 through 11, V-shaped pipe supports 93 may be mounted on movable trolleys 94. Trolleys 94 include a positioning motor 95, such as an air or hydraulic-actuated motor, and suitable controls 96. Air is supplied to motor 95 from an external source (not shown) through tubing 97 into a valve-controlled station 98. Support 93 includes a piston 99 telescopingly received in housing 100. Housing 100 includes a safety clamp 101 at its upper end. Piston 99 includes, at its upper end, the support 93 which is adjustably attached to piston 99 by means of trunnion 102. Support 93 includes a plurality of conventional pipe rollers or rubbers 103 for conveying pipeline 13.

In operation, air is supplied from motor 95 through housing 100 raising piston 99 to its required height. The support 93 is then pivoted about trunnion 102 into position for conveying pipeline 13 over rollers 103.

FIG. 14 shows an assembly way incorporating the concepts of FIGS. 10 through 13. A suitable pipe tensioning device 104 as described hereinabove is disposed on the deck of vessel 11. Pipeline 13 is supported on rollers 103 of pipe support 93 and clamped by clamps 87 of movable platforms 85. In this manner, pipeline 13 can be moved through the welding stations and tensioning device 104.

Various features may be applied to the pipeline laying barge 11 as well known by those skilled in the art. For example, means may be provided for connecting additional lengths of pipe to pipeline 13 in extremely long joints thus accelerating pipeline installation. The barge 11 may be provided with automatic pipe joint line-up and automatic (or semi-automatic) welding so as to further speed up operations and reduce installation cost. The constant tension winch 22 on barge 11 may be a heavy duty winch thus permitting winch 22 to be used to lower pipeline 13 to the ocean floor under tension supplied by wire rope 23 in storms for later pickup.

The application of tension to pipeline 13 in accordance with the teachings of this invention distributes tension load in the pipeline without harming coating or weight jacketing material on the pipeline. The welding station or stations on trolleys 15 and 17 are supported on a stable-moving platform or platforms which maintain position with respect to the pipeline being laid even though sea conditions force motion of the pipeline laying barge 11. The constant tensioning method and apparatus herein disclosed permits the maintaining of analytically determined proper tension in the pipeline 13 in a way that isolates the pipeline laying from the barge motion. Finally, since there is no relative motion between the pipeline 13 and the welder because of the stable-moving platform, pipe-joining by welding results in excellent, leak-proof connections of pipe sections.

We claim as our invention:

1. A floatable apparatus for laying a pipeline along the floor of a body of water comprising:
    an elongated platform floatable on said body of water;
    substantially horizontal guide means mounted on said floatable platform;
    a movable platform carried by said guide means and reciprocable thereon, said movable platform extending substantially the entire length of said floatable platform;
    selectively actuable pipeline gripping means mounted on said movable platform to grip selectively said pipeline and thus hold said pipeline from movement relative to said movable platform;
    first constant-force hold-back means mounted on said floatable platform and operatively connected to said movable platform to accommodate for motion of said floatable platform without moving the movable platform and adapted to apply a substantially constant tension on said pipeline when said gripping means is engaged; and
    second constant-force hold-back means mounted on said movable platform and operatively connectible to said pipeline to apply a substantially constant restraining force thereon when said gripping means is disengaged from the pipeline.

2. The apparatus of claim 1 wherein said apparatus includes pipeline assembling means mounted on said movable platform for assembling a plurality of pipe sections to form said pipeline.

3. The apparatus of claim 2 wherein said pipeline assembling means includes at least one welding station on said movable platform.

4. The apparatus of claim 1 wherein the apparatus includes third constant force hold-back means mounted on said platform and operatively connectible to said pipeline to apply a substantially constant restraining force thereon when said gripping means is disengaged.

5. The apparatus of claim 1 wherein said selectively actuable pipeline gripping means includes endless belt track means adapted to grip said pipeline therebetween; said belt track means being comprised of a plurality of rollers; and
said rollers being selectively actuable to apply equal pressure at their point of contact with said pipeline thereby forcing said belt track means against said pipeline.

6. The apparatus of claim 1 wherein said selectively actuable pipeline gripping means includes basket-weave wire sleeve gripper means adapted to grip said pipeline therebetween; and
said gripper means being adapted to provide selectively greater gripping force on said pipeline when said pipeline is moved rearwardly with respect to said gripper means than when said pipeline moves forwardly with respect to said gripper means.

7. The apparatus of claim 1 wherein said selectively actuable pipeline gripping means includes pressurizable pipeline gripper means adapted to grip said pipeline therebetween; and
pressurizing means coacting with said pressurizable gripper means for pressurizing said gripper means thereby gripping said pipeline.

8. The apparatus of claim 7 wherein said gripper means includes a plurality of pressurizable bags adapted to open and close thereby gripping said pipeline;
each of said bags being both independently slidable along said pipeline and selectively actuable; and
all of said bags being sequentially operable so as to provide increments of tension in said pipeline without damage to the coatings on said pipeline by virtue of the incremental increase in surface contact area.

9. A method for laying a pipeline on the floor of a body of water from a floatable platform adapted to assemble and lay pipeline therefrom and including at least one carriage mounted for substantially horizontal movement along said platform, said method comprising the steps of:
selectively gripping said pipeline in a steady state relative to said carriage when said floatable platform is standing;
applying a constant restraining force on said carriage to thereby apply a constant tension on said pipeline during vessel surge and take up relative movement between said carriage and said floatable platform;
maintaining a constant tension on said pipeline when said pipeline is released relative to said carriage as said floatable platform is moved to effect paying out of said pipeline;
joining a plurality of pipe lengths together to form said pipeline on said carriage; and
joining said plurality of pipe lengths on said carriage.

10. The method of claim 9 wherein the step of joining said pipe lengths on said carriage includes the step of joining said pipe lengths by welding said pipe lengths together.

11. A floatable apparatus for laying a pipeline along the floor of a body of water comprising:
an elongated platform floatable on said body of water;
substantially horizontal guide means mounted on said floatable platform;
at least one movable platform carried by said guide means and reciprocable thereon;
selectively actuable pipeline gripping means mounted on said movable platform to grip selectively said pipeline and thus hold said pipeline from movement relative to said movable platform, said selectively actuable pipeline gripping means including endless belt track means comprising a plurality of rollers adapted to grip said pipeline therebetween, said rollers being selectively actuable to apply equal pressure at their point of contact with said pipeline thereby forcing said belt track means against said pipeline;
first constant-force hold-back means mounted on said floatable platform and operatively connected to said movable platform to accommodate for motion of said floatable platform without moving the movable platform and adapted to apply a substantially constant tension on said pipeline when said gripping means is engaged; and
second constant-force hold-back means mounted on one of said platforms and operatively connectible to said pipeline to apply a substantially constant restraining force thereon when said gripping means is disengaged from the pipeline.

12. A floatable apparatus for laying a pipeline along the floor of a body of water comprising:
an elongated platform floatable on said body of water;
substantially horizontal guide means mounted on said floatable platform;
at least one movable platform carried by said guide means and reciprocable thereon;
selectively actuable pipeline gripping means mounted on said movable platform to grip selectively said pipeline and thus hold said pipeline from movement relative to said movable platform, said gripping means including basket-weave wire sleeve gripper means adapted to grip said pipeline therebetween with said gripper means being adapted to provide selectively greater gripping force on said pipeline when said pipeline is moved rearwardly with respect to said gripper means than when said pipeline moves forwardly with respect to said gripper means;
first constant-force hold-back means mounted on said floatable platform and operatively connected to said movable platform to accommodate for motion of said floatable platform without moving the movable platform and adapted to apply a substantially constant tension on said pipeline when said gripping means is engaged; and
second constant-force hold-back means mounted on one of said platforms and operatively connectible to said pipeline to apply a substantially constant restraining force thereon when said gripping means is disengaged from the pipeline.

13. A floatable apparatus for laying a pipeline along the floor of a body of water comprising:
an elongated platform floatable on said body of water;
substantially horizontal guide means mounted on said floatable platform;
at least one movable platform carried by said guide means and reciprocable thereon;
selectively actuable pipeline gripping means mounted on said movable platform to grip selectively said pipeline and thus hold said pipeline from movement relative to said movable platform, said selectively actuable pipeline gripping means including pressurizable pipeline gripper means adapted to grip said pipeline therebetween, pressurizing means coacting with said pressurizable gripper means for pressurizing said gripper means thereby gripping said pipeline, said gripper means including a plurality of pressurizable bags adapted to open and close thereby gripping said pipeline, each of said bags being both independently slidable along said pipeline and selectively actuable, and all of said bags being sequentially operable so as to provide increments of tension in said pipeline without damage to the coatings on said pipeline by virtue of the incremental increase in surface contact area;
first constant-force hold-back means mounted on said floatable platform and operatively connected to said movable platform to accommodate for motion of said floatable platform without moving the movable platform and adapted to apply a substantially constant tension on said pipeline when said gripping means is engaged; and
second constant-force hold-back means mounted on one of said platforms and operatively connectible to said pipeline to apply a substantially constant restraining force thereon when said gripping means is disengaged from the pipeline.

References Cited

UNITED STATES PATENTS

| | | | | |
|---|---|---|---|---|
| 3,491,541 | 1/1970 | Berard | | 61—72.3 |
| 2,792,930 | 5/1957 | Graham | | 61—72.3X |
| 2,910,835 | 11/1959 | Timothy | | 61—72.3 |
| 3,010,631 | 11/1961 | Gretter | | 226—172 |
| 3,321,925 | 5/1967 | Shaw | | 61—72.3 |

J. KARL BELL, Primary Examiner

U.S. Cl. X.R.

61—46.5